(12) United States Patent
Narayan et al.

(10) Patent No.: US 6,366,430 B1
(45) Date of Patent: Apr. 2, 2002

(54) METHOD AND APPARATUS FOR IMPROVED STATIC ANGLE ADJUSTMENT

(75) Inventors: Shri Hari Narayan, Minneapolis; Paul E. Kupinski, Eagan; Sandeepan Bhattacharya, Bloomington, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/730,052

(22) Filed: Dec. 5, 2000

Related U.S. Application Data

(63) Continuation of application No. PCT/US00/42550, filed on Dec. 5, 2000.
(60) Provisional application No. 60/169,204, filed on Dec. 6, 1999.

(51) Int. Cl.[7] .............................. G11B 5/48; G11B 21/16
(52) U.S. Cl. ................................. 360/244.9; 29/603.03
(58) Field of Search ...................... 72/379.2; 29/603.03, 29/603.04; 360/244.9, 245.2

(56) References Cited

U.S. PATENT DOCUMENTS

| | | | |
|---|---|---|---|
| 5,201,458 A | * 4/1993 | Hagen | 228/199 |
| 5,452,158 A | * 9/1995 | Harrison et al. | 360/104 |
| 5,471,734 A | 12/1995 | Hatch et al. | 29/603 |
| 5,568,332 A | * 10/1996 | Khan | 360/104 |
| 5,588,200 A | * 12/1996 | Schudel | 29/603.01 |
| 5,748,409 A | * 5/1998 | Girard et al. | 360/104 |
| 5,832,763 A | 11/1998 | Girard | 72/16.3 |
| 5,832,764 A | * 11/1998 | Girard | 72/16.3 |
| 5,844,752 A | * 12/1998 | Bozorgi et al. | 360/104 |
| 5,877,920 A | 3/1999 | Resh | 360/104 |
| 5,991,122 A | 11/1999 | Tangren et al. | 360/104 |
| 6,115,220 A | * 9/2000 | Khan et al. | 360/244.2 |

FOREIGN PATENT DOCUMENTS

WO    PCT/US/00/42550    12/2000

OTHER PUBLICATIONS

U.S. Provisional Patent Application of Shri Hari Narayan, Paul E. Kupinski and Sandeepan Bhattacharya, Serial No. 60/169,204, filed Dec. 6, 1999, entitled "Improved RSA Adjust Methodology and Related Suspension Designs".

* cited by examiner

Primary Examiner—William Klimowicz
(74) Attorney, Agent, or Firm—Brian D. Kaul; Westman, Champlin & Kelly

(57) ABSTRACT

The present invention relates to a method and apparatus for providing improved roll static angle adjustment for head gimbal assemblies (HGA's) used in disc drives. In the method, proximal and distal clamping members are attached to a load beam of the HGA and are separated by a distance of 4–30% of the length of the load beam. One of the distal and proximal clamping members is rotated about a longitudinal axis of the load beam such that the relative angular position of the distal and proximal clamping members reaches an adjust angle. Also disclosed is a rigid beam section of an HGA that includes apertures which are positioned along maximum stress contours where early plastic deformation of the rigid beam section is desired during adjustment of the roll static angle.

11 Claims, 5 Drawing Sheets

METHOD AND APPARATUS FOR IMPROVED STATIC ANGLE ADJUSTMENT

CROSS-REFERENCE TO RELATED APPLICATION

This application claims priority of U.S. Provisional Application No. 60/169,204, filed Dec. 6, 1999 by Shri Hari Narayan, Paul E. Kupinski and Sandeepan Bhattacharya for "IMPROVED RSA ADJUST METHODOLOGY AND RELATED SUSPENSION DESIGNS"; this application is also a continuation of International Application No. PCT/US00/42550, filed Dec. 5, 2000 filed on an even date herewith for "Method and Apparatus for Improved Roll Static Angle Adjustment," which in turn claims priority of the aforementioned U.S. Provisional Application.

FIELD OF THE INVENTION

The present invention relates to disc storage systems. More specifically, the present invention relates to a method and apparatus for adjusting the roll static angle of a disc drive suspension.

BACKGROUND OF THE INVENTION

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective recording heads. Each head includes a hydrodynamic (e.g. air) bearing slider and a transducer for writing information to and reading information from the disc surface. An actuator mechanism moves the heads from track to track across the surfaces of the discs under control of electronic circuitry. The actuator mechanism includes a track accessing arm and a head gimbal assembly (HGA) for each head.

The HGA generally includes a load beam and a gimbal. The load beam includes a rigid beam section to which the gimbal is attached. The rigid beam section of the load beam transfers a pre-load force from a flexible beam portion to the head which forces the head toward the disc surface. The gimbal is positioned between the rigid beam section of the load beam and the slider to provide a resilient connection that allows the slider to pitch and roll while following the typography of the disc.

One important performance-related criteria of the HGA is known as its static attitude. The static attitude of the slider refers to the positional orientation of the slider with respect to the surface of the disc over which it is flying. The slider is generally designed to fly at a predetermined orientation (typically parallel) with the surface of the disc. Deviations from this parallel relationship which result in the front and back edges of the slider being at different heights from the disc are known as pitch errors. Deviations from this parallel relationship which result in the opposite sides of the slider being at different heights from the disc are known as roll errors. Any pitch or roll error in the desired flying attitude of the slider can degrade the performance of the disc drive. As a result, it is preferable to zero the pitch and roll angles of the head when mounted to the HGA.

The load beam, as with all mechanical structures, has a resonant frequency, which can cause instability in the HGA. The first bending mode of the HGA generally causes the load beam to vibrate or move in a vertical plane or a plane that is transverse to the plane of the load beam when the load beam is symmetric about a longitudinal axis of the load beam. However, when a twist is made in the rigid beam section of the load beam about the longitudinal axis, the load beam becomes asymmetric about the longitudinal axis. As a result, the load beam will also vibrate or oscillate in a horizontal plane at the resonant frequency. This horizontal movement produces off-track errors thereby limiting the performance of the disc drive.

When the head is mounted to the load beam, it is generally oriented with non-zero roll and pitch angles. The roll and pitch angles can be forced to zero degrees using a static attitude adjust machine (SAAM). Clamping members of the SAAM attach to the rigid beam section and twist the rigid beam section along its longitudinal axis to set the roll static angle of the head to zero degrees. Prior art methods have positioned the clamping members at the extreme ends of the rigid beam section to maximize the distance separating them. The desire was to minimize the amount of twist per unit length of the rigid beam section to avoid damaging the rigid beam section. Unfortunately, these prior art methods produce HGA's having undesirable off-track errors.

There remains a continuing need for improved methods for adjusting the roll static attitude of the load beam. In particular, there is need to improve the sensitivity of the load beam twisting by the SAAM while simultaneously reducing off-track errors resulting from the first bending mode of the HGA.

SUMMARY OF THE INVENTION

The present invention relates to a method and apparatus for providing improved roll static angle adjustment for head gimbal assemblies (HGA's) used in a disc drive. The method of the present invention improves roll static angle adjustment of a head located at a distal end of an HGA. In the method, a high stress region is formed in the rigid beam section proximate a distal end where a distal clamping member is coupled. A proximal clamping member is coupled to the rigid beam section a distance away from the distal clamping member. Finally at least one of the distal and proximal clamping members is rotated about the longitudinal axis such that a relative angular position of the distal and proximal clamping members reaches an adjust angle resulting in a change in the roll static angle of the head.

The apparatus of the present invention is directed to a load beam of an HGA for use in a disc drive. The load beam includes a mounting portion, a flexure arm, and a rigid beam section. The mounting portion is adapted to couple the load beam to a track accessing arm of the disc drive. The flexible beam portion is attached to the mounting portion and is adapted to supply a pre-load force to a head of the HGA through the flexure arm. The rigid beam section includes a proximal end that is attached to the mounting portion, a distal end attached to the flexure arm, and a high stress region. The high stress region includes a plurality of apertures which define high stress contours of the rigid beam section where plastic deformation is desired during roll static angle adjustment.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
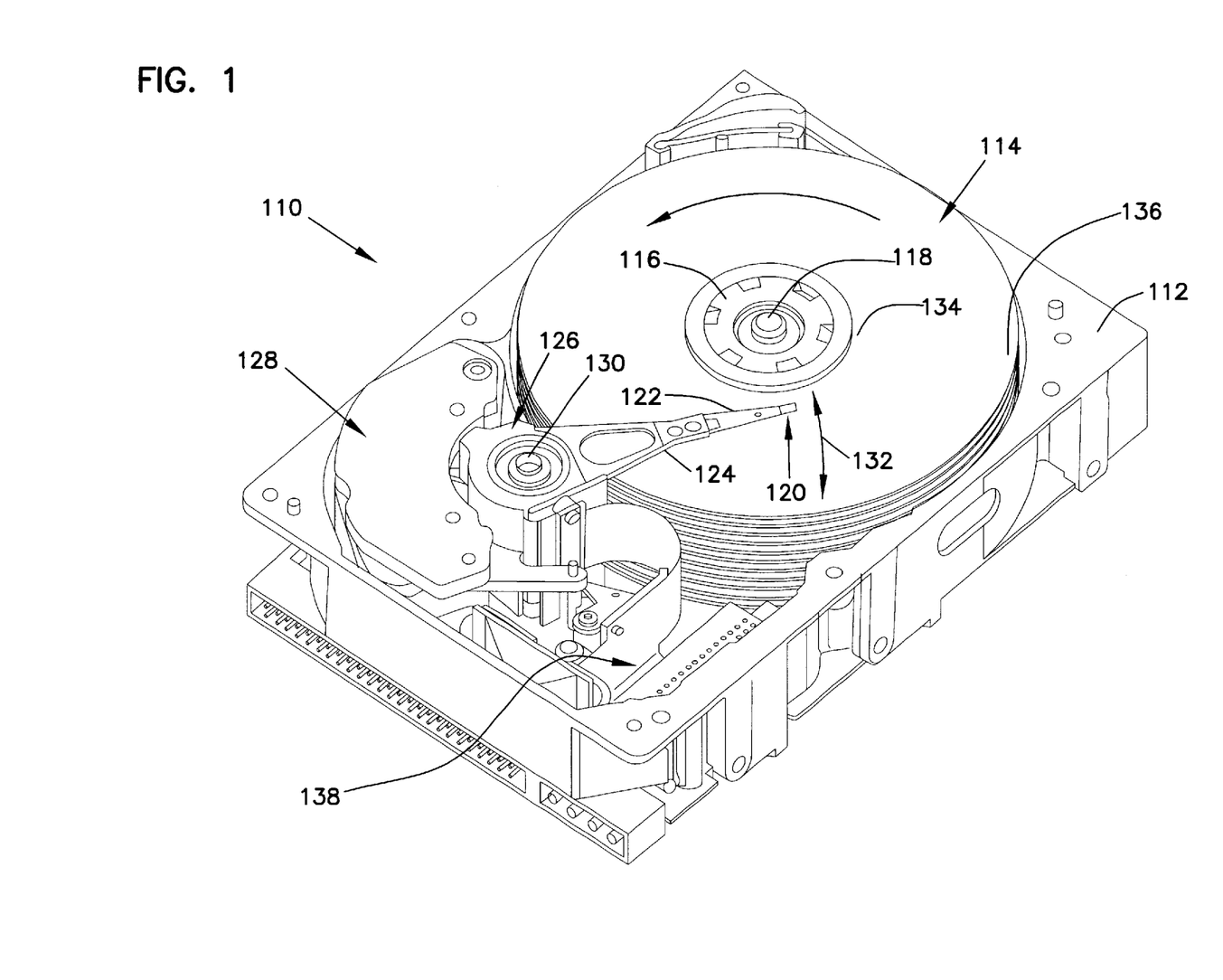
FIG. 1 is a perspective view of a disc drive in accordance with one embodiment of the present invention.

FIG. 1 is a perspective view of a disc drive 110 in which benefits of the present invention can be realized. Disc drive 110 includes a housing with a base 112 and a top cover (not shown). Disc drive 110 further includes a disc pack 114, which is mounted on a spindle motor (not shown) by a disc clamp 116. Disc pack 114 includes a plurality of individual discs which are mounted for co-rotation about central axis 118. Each disc surface has an associated head 120 which is mounted to disc drive 110 for communication with the disc surface. In the example shown, heads 120 are supported by head gimbal assemblies (HGA's) 122 which are in turn attached to track accessing arms 124 of actuator 126. Actuator 126 is of the type known as a rotary moving coil actuator and includes a voice coil motor, shown generally at 128. Voice coil motor 128 rotates actuator 126 with its attached heads 120 about a pivot shaft 130 to position heads 120 over a desired data track along a path 132 between a disc inner diameter 134 and a disc outer diameter 136. Voice coil motor operates under control of internal circuitry 138. Write circuitry within internal circuitry 138 encodes the data to be stored into successive code words and sends the code words in the form of a serial analog write signal to the write transducer on head 120 which encodes magnetic flux reversals within a magnetic layer on the disc surface.

Figures 2, 3:
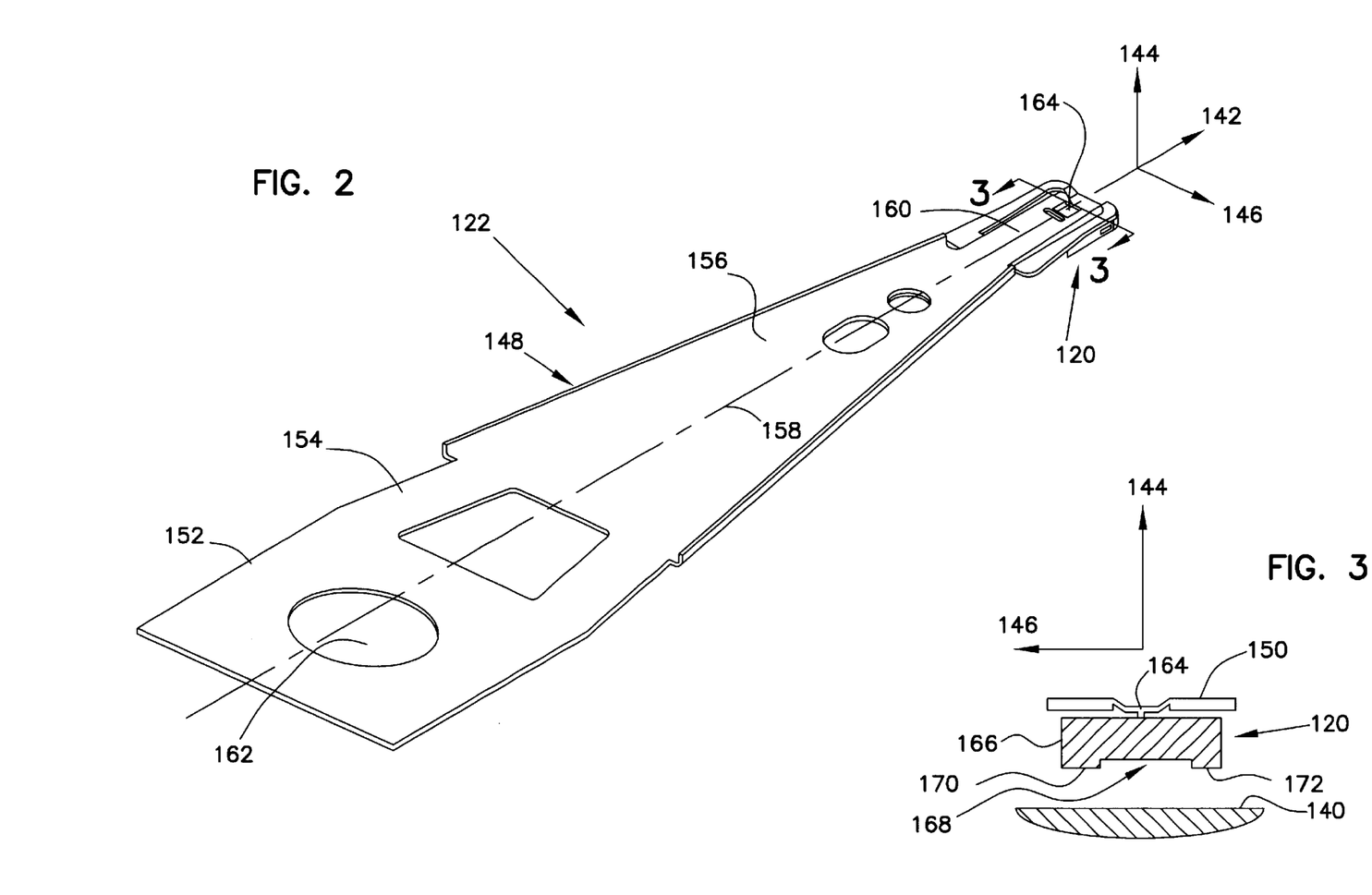
FIG. 2 shows a perspective view of a head gimbal assembly in accordance with one embodiment of the invention.
FIG. 3 shows a cross-sectional view of view of a head gimbal assembly in accordance with one embodiment of the invention, taken at line 3—3 of FIG. 2.

FIG. 2 shows a perspective view of an example of HGA 122 and FIG. 3 shows a cross-sectional view of head 120, taken at line 3—3 of FIG. 2, mounted to HGA 122 and positioned above disc surface 140. Also shown in FIGS. 2 and 3 are x-axis 142, y-axis 144, and z-axis 146. Typical HGA's 122 include load beam 148 and gimbal 150. Load beam 148 generally includes mounting portion 152, flexible beam portion 154, rigid beam section 156, longitudinal axis 158 aligned with x-axis 142, and flexure arm 160. Mounting portion 152 includes swage hole 162 which mounts to track accessing arm 124 (shown in FIG. 1) through a base plate (not shown). Flexible beam portion 154 applies a pre-load force to head 120 through rigid beam section 156 and flexure arm 160 to limit the flying height of head 120. The pre-load force can be applied to head 120 at dimple 164 of flexure arm 160.

Each head 120 includes a hydrodynamic (e.g. air) bearing slider 166 and a transducer (not shown) for writing information to, and reading information from, disc surface 140. Gimbal 150 is positioned between rigid beam section 156 of load beam 148 and slider 166 to provide a resilient connection that allows slider 166 to pitch (rotate about the z-axis 146) and roll (rotate about longitudinal axis 158 or the x-axis 142) while following the typography of disc surface 140. Slider 166 includes air-bearing surfaces 168 which face disc surface 140. For example, a conventional catamaran slider includes an air-bearing surface 168 that includes a pair of raised side rails 170 and 172 which face disc surface 140, as shown in FIG. 2. Air-bearing surfaces 170 and 172 are aligned approximately parallel to the tangential velocity of the disc. As disc 140 rotates, air passes beneath air-bearing surfaces 168 and skin friction on air bearing surfaces 168 causes the air pressure between the surface of disc 140 and air-bearing surfaces 168 to increase which creates a hydrodynamic lifting force that causes slider 166 fly above the surface of disc 140. The pre-load force and the hydrodynamic lifting force reach an equilibrium based upon the hydrodynamic properties of the slider and the speed of rotation of disc 140.

It is desired that head 120 fly above disc 140 at a predetermined roll angle, which is typically zero. The roll angle relates to the angle that head 120 is rotated about x-axis 142 relative to disc surface 140. In the example shown in FIG. 3, the roll angle is approximately zero. Unfortunately, when head 120 is mounted to load beam 148, it is generally oriented at an undesired roll angle. The desired roll angle can be set using a static attitude adjust machine (SAAM). The SAAM includes clamping members which can twist rigid beam section 156 about longitudinal axis 158 (x-axis 142) to set the roll static angle of head 120 to the desired setting (typically zero degrees).

Figure 4:
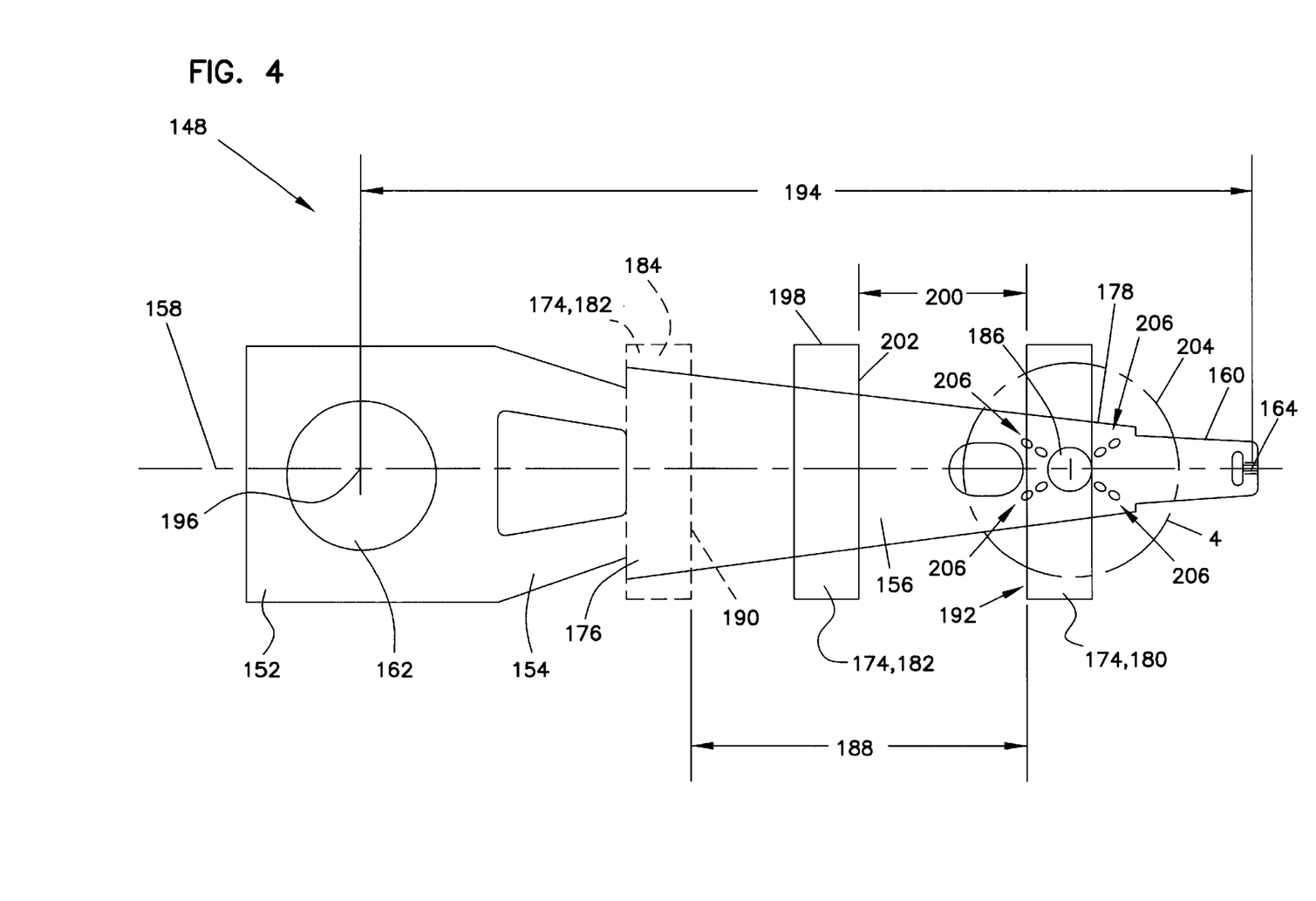
FIG. 4 shows a simplified top plan view of a head gimbal assembly with clamping members of a static attitude adjust machine positioned along a rigid beam portion in accordance with one embodiment of the present invention.

FIG. 4 shows an example of a load beam 148 (without gimbal 150) with clamping members 174 of a SAAM positioned along rigid beam section 156. The details of clamping members 174 and the components the SAAM to which clamping members 174 attach, are not shown to simplify the illustration. Rigid beam section 156 includes proximal end 176 and distal end 178. Clamping members 174 generally include distal clamping member 180 positioned adjacent distal end 178 of rigid beam section 156 and a proximal clamping member 182 positioned toward proximal end 176 of rigid beam section 156. In general, one of the clamping members 180 or 182 is rotated, relative to the other clamping member, by an adjust angle thereby twisting the portion of rigid beam section 156 positioned therebetween to the adjust angle. This twisting of rigid beam section 156 produces stresses in rigid beam section 156 which, when in excess of a yield value, causes permanent deformation of rigid beam section 156 and results in an adjustment to the roll static angle of head 120.

In the prior art, it was thought to be beneficial to spread out the twisting of rigid beam section 156 over its entire length to minimize damage to rigid beam section 156. This was accomplished by positioning distal and proximal clamping members 180 and 182 as far apart as possible along rigid beam section 156. This is shown in FIG. 4 where proximal clamping member 184, as found in the prior art, is positioned adjacent proximal end 176 of rigid beam section while distal clamping member 180 is positioned as close to distal end 178 as possible, as shown in FIG. 4. The spacing from distal end 178 is due to the attachment of gimbal 150 (FIG. 3). As a result, distal clamping member 180 is generally positioned near tooling hole 186.

The distance separating clamping members 180 and 184, as found in the prior art, is defined as distance 188 which is the distance between inside edge 190 of clamping member 184 and inside edge 192 of distal clamping member 180. Distance 188 is generally greater than 31% of length 194 of load beam 148, which is defined as the distance between center 196 of swage hole 162 and dimple 164 of flexure arm 160. Length 194 of a load beam 148 of a typical HGA 122, such as those mentioned above, is 0.6 inches and distance 188 is approximately 0.216 inches. The prior art positioning of clamping members 184 and 180 maximizes the adjust angle that rigid beam section 156 must be twisted to produce a desired adjustment of the roll static angle of head 120.

Although contrary to the rationale for the method used by the prior art, one aspect of the present invention involves reducing the distance between proximal clamping member 182 and distal clamping member 180 to improve the relationship between a change in the roll static angle of head 120 to a change in the adjust angle. The magnitude of the stresses within rigid beam section 156 when it is twisted depends, in part, on the distance separating proximal and distal clamping members 182 and 180, respectively. For a given adjust angle, as the distance separating proximal and distal clamping members 182 and 180 decreases, the magnitude of the stresses within rigid beam section 156 increases. As a result, the adjust angle required to cause permanent deformation to rigid beam section 156 decreases as the distance separating the clamping members 180 and 182 decreases. In one embodiment, prior art proximal clamping member 184 is replaced by proximal clamping member 198 which is separated from distal clamping member 180 by a distance 200 as measured between inside edge 202 of proximal clamping member 198 and inside edge 192 of distal clamping member 180. Distance 200 is shorter than distance 188 of the prior art. As a result, the relationship between a change in the roll static angle of head 120 to a change in the adjust angle is improved. In other words, a load beam 148 twisted with clamping members 198 and 180 that are positioned in accordance with the present invention, is more sensitive to a change in the adjust angle than would otherwise be possible using roll static angle adjustment methods found in the prior art.

In one embodiment of the invention, distance 200 is preferably approximately 21% of length 194 of load beam 148. For example, if length 194 is 0.6 inches, distance 200 is preferably approximately 0.126 inches. Distance 200 is generally limited by the maximum twist per unit length that rigid beam section 156 is capable of withstanding without causing undesired damage to rigid beam section 156, such as the formation of kinks or other discontinuities. It has been determined experimentally that this limit is approximately 4% of length 194 of typical load beams 148. In a more general embodiment of the invention, distance 200 is less than 30% of length 194. Additional embodiments include lengths 200 which are, less than 25% of length 194, less than 20% of length 194, less than 15% of length 194, and less than 10% of length 194. Further embodiments of the invention include additional limitations of distance 200 where applicable to the above described lengths 200. These embodiments include lengths 200 which are greater than 4% of length 194, greater than 10% of length 194, greater than 15% of length 194, greater than 20% of length 194, and greater than 25% of length 194. Still further alternative embodiments of the invention include any possible combination of the above maximum and minimum limitations of distance 200.

During static roll angle adjustment, maximum stress contours where permanent deformation of rigid beam section 156 occurs, predominantly takes place in a high stress region 204 of rigid beam section 156, which is located approximately within circle 4 and near distal clamping member 180, as shown in FIG. 4. These maximum stress contours are found in high stress region 204 due to a reduced cross-sectional area of rigid beam section 156. One cause of the reduced cross-sectional area of rigid beam section 156 is the general tapering of rigid beam section 156 from proximal end 176 toward distal end 178. Another cause is tooling hole 186.

Figure 5:
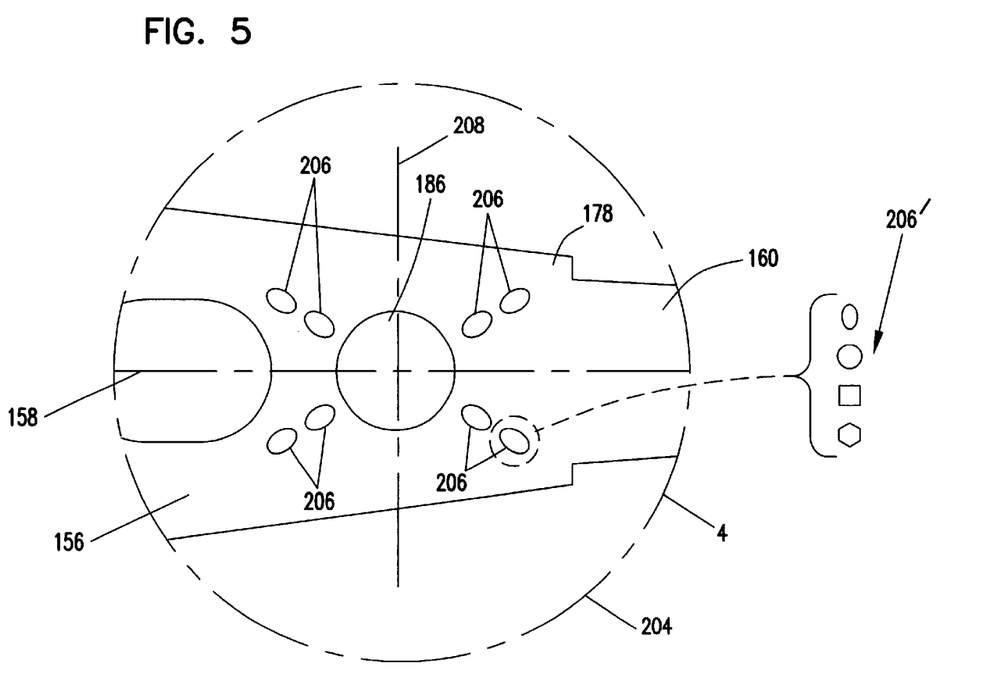
FIG. 5 shows a magnified view of the portion of the head gimbal assembly of FIG. 4 that is contained in circle 4.

In one embodiment of the invention, high stress region 204 is enhanced by forming apertures 206, which are shown best FIG. 5, which is a magnified view of high stress region 204 shown in FIG. 4 without distal clamping member 180. Apertures 206 are positioned in high stress region 204, preferably near tooling hole 186, and cause the stresses in high stress region 204 to become higher than they would be without apertures 206 for a given adjust angle. As a result, apertures 206 cause the onset of plastic deformation of rigid beam section to occur earlier and at a smaller adjust angle than would be possible without apertures 206. Furthermore, apertures 206 can be used to control the locations of rigid beam section 156 where plastic deformation is desired during roll static angle adjustment, thereby limiting the area of rigid beam section 156 that is damaged or permanently deformed.

Apertures 206 are preferably oval in shape, but can also be formed of various other shapes, such as circular, rectangular, and polygonal, as indicated at 206'. Apertures 206 are generally positioned at an angle to coincide with maximum stress contours that develop during the twisting of rigid beam section 156 and extend away from distal clamping member 180 toward the distal and proximal ends 178 and 176, respectively, of the rigid beam section 156. In one embodiment, apertures 206 are symmetrically positioned about longitudinal axis 158. In yet another embodiment, apertures 206 are symmetrically positioned about an axis 208, which is perpendicular to longitudinal axis 156.

Figure 6:
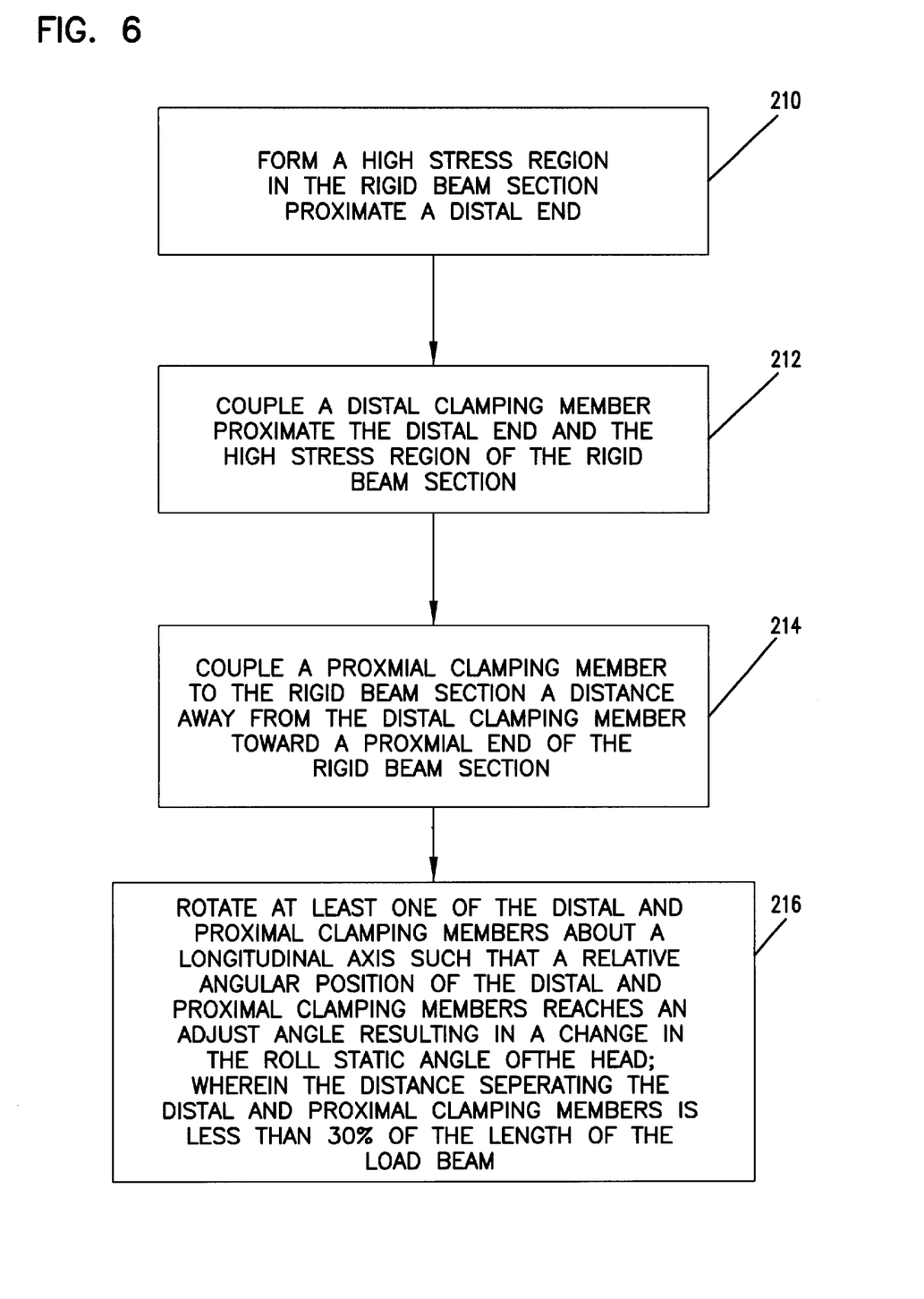
FIG. 6 is a flowchart representing a method of adjusting the low static angle of a head of a head gimbal assembly, in accordance with one embodiment of the invention.

The general method used by the present invention to adjust the roll static angle of HGA 122 is illustrated in the flow chart of FIG. 6. At step 210, a high stress region 204 is formed in rigid beam section 156 proximate distal end 178. As mentioned above, the high stress region can be formed by the narrowing of rigid beam section 156 toward distal end 178, by tooling hole 186, or by the formation of apertures 206. At step 212, distal clamping member 180 is coupled proximate distal end 178 and high stress region 204 of rigid beam section 156. At step 214, proximal clamping member 198 is coupled to rigid beam section 156 a distance 200 away from distal clamping member 180 toward proximal end 176 of rigid beam section 156. Finally, at step 216, either distal clamping member 180 or proximal clamping member 198 is rotated about longitudinal axis 158 such that the relative angular position of the distal and proximal clamping members 180 and 198 reaches an adjust angle resulting in a change in the roll static angle of head 120. The distance separating distal and proximal clamping members 180 and 198, respectively, is less than 30% of length 194 of load beam 148. This method results in an improvement of the relationship between the change in the roll static angle of head 120 to a change in the adjust angle.

At least three advantages have been realized by the improved method of the present invention. One advantage of the present invention is that load beam 148 becomes more sensitive to the twisting of rigid beam section 156 by clamping members 180 and 198 as compared to the prior art. For a given adjust angle that rigid beam section 156 is twisted, the method of the present invention results in a greater adjustment to the roll static angle of head 120 than the method used in the prior art. For example, experiments have shown that rotating the relative angular position of clamping members 180 and 184 that are separated a distance of 31% of length 194 of load beam 148 (prior art method) to an adjust angle of 1° results in an adjustment to the roll static angle of head 120 of 1.24°, whereas twisting rigid beam section 156 by the same amount using clamping members 180 and 198 that are positioned in accordance with the present invention, results in an adjustment to the roll static angle of head 120 of 1.38°. In other words, a load beam 148 will require 11% less twisting of rigid beam section 156 to produce the desired roll static angle adjustment at head 120 with the method of the present invention as compared to that of the prior art.

Another advantage of the present invention is that the asymmetry of load beam 148 is moved toward distal end 178, which reduces the likelihood of off-track errors when used in a disc drive 110 (FIG. 1). Load beam 148, as with all mechanical structures, has various resonant modes. When a resonant mode of load beam 148 is excited, load beam 148 will oscillate at the resonant frequency. The resulting movement of load beam 148 can occur in a bending mode, a twisting mode or a combination of the two. When load beam 148 is symmetric about longitudinal axis 158 (FIG. 2), the first bending mode of load beam 148 will cause load beam 148 to oscillate in a vertical plane or along the y-axis. However, when a twist is made in rigid beam section 156 about the longitudinal axis 158 to adjust the roll static angle, rigid beam section 156 becomes asymmetric about longitudinal axis 158 thereby introducing a twisting mode. The twisting mode of load beam 148 will cause head 120 to oscillate horizontally or along the z-axis 146 (FIG. 2), which can result in off-track errors and limit the performance of disc drive 110. The magnitude of the horizontal oscillations for a given load beam 148 depends, in part, on the location of the asymmetry of rigid beam section 156 caused by the roll static angle adjustment. In general, the closer the asymmetry of rigid beam section 156 is to proximal end 176, the greater the magnitude of the horizontal oscillations that will be produced at the resonant frequency and, thus, the greater the likelihood that off-track errors will occur. By moving proximal clamping member 198 closer to distal end 178 of rigid beam section (FIG. 4), the asymmetry of rigid beam section 156 is moved further from proximal end 176 and closer to distal end 178, as compared to the prior art. As a result, the magnitude of the horizontal oscillations that are produced in load beam 148 of the present invention at the resonant frequency are reduce thereby reducing the likelihood of off-track errors and improving disc drive performance.

Yet another advantage of the present invention is that the adjustment of the roll static angle of head 120 is more accurate since rigid beam section 156 yields more quickly than would be possible using prior art methods. The method of the present invention produces higher stresses in rigid beam section 156 due to a shorter free length available for twisting. These higher stresses cause the yield stress of rigid beam section 156 to be reached faster thus leading to quicker plastic deformation of rigid beam section 156. As a result, the sensitivity of a change in the roll static angle to a change in the adjust angle is improved.

In summary, one aspect of the present invention is directed toward a method for adjusting a roll static angle of a head 120 of an HGA 122. The HGA 122 includes a load beam 148 having a length 194, a longitudinal axis 158, and a rigid beam section 156. In one step of the method a high stress region 204 is formed in the rigid beam section 156 proximate a distal end 178. Next, a distal clamping member 180 is coupled to the rigid beam section 156 proximate the distal end 178 and the high stress region 204 and a proximal clamping member 198 is coupled to the rigid beam section 156 a distance 200 away from the distal clamping member 180 toward a proximal end 176. The distance 200 separating the distal and proximal clamping members is less than 30% of the length of the load beam. Finally, at least one of the distal and proximal clamping members 180 and 198, respectively, is rotated about the longitudinal axis 158 such that a relative angular position of the distal and proximal clamping members 198 and 180 reaches an adjust angle resulting in a change in the roll static angle of the head 120. This method results in an improved relationship (sensitivity) between the change in the roll static angle to a change in the adjust angle where.

Another aspect of the present invention is directed toward a load beam 148 of an HGA 122 for use in a disc drive 110. The load beam 148 includes a mounting portion 152, a flexible beam portion 154, a rigid beam section 156, and a flexure arm 160. The mounting portion 152 is adapted to couple the load beam 148 to a track accessing arm 124 of the disc drive 110. The flexible beam portion 154 is attached to the mounting portion 152 and is adapted to supply a pre-load which is applied to the head 120 through flexure arm 160. The rigid beam section 156 has a proximal end 176 attached to the flexible beam portion 154, a distal end 178 attached to flexure arm 160, a longitudinal axis 158, and a high stress region 204 having plurality of apertures 206. The apertures 206 define high stress contours of the rigid beam section 156 where plastic deformation of the rigid beam section 156 is desired during roll static angle adjustment.

It is to be understood that even though numerous characteristics and advantages of various embodiments of the present invention have been set forth in the foregoing description, together with the details of the structure and function of various embodiments of the invention, this disclosure is illustrative only, and changes may be made in details, especially in matters of structure and arrangements of parts within the principles of the present invention to the full extent indicated by the broad general meaning of the terms in which the pending claims are expressed.

What is claimed is:

1. A method of improving roll static angle adjustment of a head located at a distal end of a head gimbal assembly which includes a load beam having a length, a longitudinal axis, and a rigid beam section, the method comprising the steps of:

(a) forming a high stress region in the rigid beam section proximate a distal end;

(b) coupling a distal clamping member to the rigid beam section proximate the distal end and the high stress region of the rigid beam section;

(c) coupling a proximal clamping member to the rigid beam section a distance away from the distal clamping member toward a proximal end of the rigid beam section; and (d) rotating at least one of the distal and proximal clamping members about the longitudinal axis such that a relative angular position of the distal and proximal clamping members reaches an adjust angle resulting in a change in the roll static angle of the head; wherein the distance separating the distal and proximal clamping members is less than 30% of the length of the load beam, whereby a sensitivity of the change in the roll static angle to a change in the adjust angle is improved.

2. The method of claim 1, wherein:

the rigid beam section includes a high stress region having apertures which define high stress contours of the rigid beam section where plastic deformation of the rigid beam section is desired during the rotating step (d); and the coupling step (b) includes positioning the distal clamping member proximate the high stress region of the rigid beam section.

3. The method of claim 2, wherein the apertures extend away from the distal clamping member toward the distal and proximal ends of the rigid beam section.

4. The method of claim 2, wherein the apertures have shapes selected from a group consisting of circular, oval, rectangular, and polygonal.

5. The method of claim 2, wherein the apertures are symmetric about the longitudinal axis.

6. The method of claim 2, wherein the apertures are symmetric about an axis that is perpendicular to the longitudinal axis.

7. The method of claim 1, wherein the distance separating the distal and proximal clamping members is greater than 4% of the length of the load beam.

8. The method of claim 1, wherein the distance separating the distal and proximal clamping members is less than 25% of the length of the load beam.

9. The method of claim 1, wherein the distance separating the distal and proximal clamping members is less than 20% of the length of the load beam.

10. The method of claim 1, wherein the distance separating the distal and proximal clamping members is less than 15% of the length of the load beam.

11. The method of claim 1, wherein the distance separating the distal and proximal clamping members is less than 10% of the length of the load beam.

* * * * *